United States Patent
Reuter

(10) Patent No.: US 9,546,866 B2
(45) Date of Patent: Jan. 17, 2017

(54) POSITION DETERMINATION APPARATUS

(71) Applicant: Marco Systemanalyse und Entwicklung GmbH, Dachau (DE)

(72) Inventor: Martin Reuter, Dachau (DE)

(73) Assignee: MARCO SYSTEMANALYSE UND ENTWICKLUNG GMBH, Dachau (DE)

( * ) Notice: Subject to any disclaimer, the term of this patent is extended or adjusted under 35 U.S.C. 154(b) by 931 days.

(21) Appl. No.: 13/855,312

(22) Filed: Apr. 2, 2013

(65) Prior Publication Data
US 2013/0262010 A1 Oct. 3, 2013

(30) Foreign Application Priority Data
Apr. 2, 2012 (DE) .................. 10 2012 205 363

(51) Int. Cl.
| | |
|---|---|
| *G01P 21/00* | (2006.01) |
| *G01C 25/00* | (2006.01) |
| *G01B 21/16* | (2006.01) |
| *F15B 1/24* | (2006.01) |

(52) U.S. Cl.
CPC .............. *G01B 21/16* (2013.01); *F15B 1/24* (2013.01); *F15B 2201/31* (2013.01); *F15B 2201/51* (2013.01); *F15B 2201/515* (2013.01)

(58) Field of Classification Search
CPC .................................................. G01B 21/16
USPC ......................................................... 702/94
See application file for complete search history.

(56) References Cited

U.S. PATENT DOCUMENTS

| | | | |
|---|---|---|---|
| 4,936,143 A * | 6/1990 | Schutten ............... | G01D 5/243 73/597 |
| 5,520,053 A | 5/1996 | Weber et al. | |
| 6,546,909 B1 * | 4/2003 | Clarke .................... | F02G 3/02 123/254 |
| 7,107,767 B2 | 9/2006 | Frazer et al. | |
| 7,918,246 B2 | 4/2011 | Stroganov | |
| 8,201,582 B2 | 6/2012 | Stroganov et al. | |
| 8,646,484 B2 * | 2/2014 | Stroganov ............... | F15B 1/24 138/26 |
| 2008/0292483 A1 | 11/2008 | DeKoning | |

(Continued)

FOREIGN PATENT DOCUMENTS

| | | |
|---|---|---|
| DE | 2513846 | 10/1975 |
| DE | 10137988 A1 | 2/2003 |

(Continued)

OTHER PUBLICATIONS

German Search Report for corresponding German Patent Application No. 10 2012 205 363.8; dated Sep. 18, 2012; 5 pgs.

(Continued)

*Primary Examiner* — Manuel L Barbee
*Assistant Examiner* — Jeremy Bishop
(74) *Attorney, Agent, or Firm* — Cantor Colburn LLP

(57) ABSTRACT

An apparatus for determining the position of a movable separation element which is arranged within an accumulator as a separator between a gas space and a fluid space, wherein the determination apparatus comprises at least one pressure sensor for the detection of pressure data, at least one ultrasonic sensor for the detection of ultrasonic data and at least one calculation unit for the evaluation of the data with the aid of which determination apparatus the position of the separation element can be determined.

10 Claims, 7 Drawing Sheets

(56) References Cited

U.S. PATENT DOCUMENTS

2010/0050622 A1    3/2010   Stroganov
2010/0090381 A1    4/2010   Stroganov et al.

FOREIGN PATENT DOCUMENTS

| DE | 202004009637 U1 | 10/2004 |
|----|-----------------|---------|
| DE | 212008000107 U1 | 1/2011 |
| DE | 212008000109 U1 | 2/2011 |
| DE | 102009048475 A1 | 4/2011 |
| EP | 0942194 A1 | 2/1999 |
| EP | 0941813 B1 | 9/1999 |
| JP | 60-196641 | 10/1985 |
| JP | H02-041701 U | 3/1990 |
| WO | 9404898 A1 | 3/1994 |
| WO | 2010041975 A1 | 4/2010 |
| WO | 2010134840 A1 | 11/2010 |
| WO | 2012008867 A2 | 1/2012 |

OTHER PUBLICATIONS

English translation of German Search Report for corresponding German Patent Application No. 10 2012 205 363.8; dated Sep. 18, 2012; 6 pgs.

\* cited by examiner

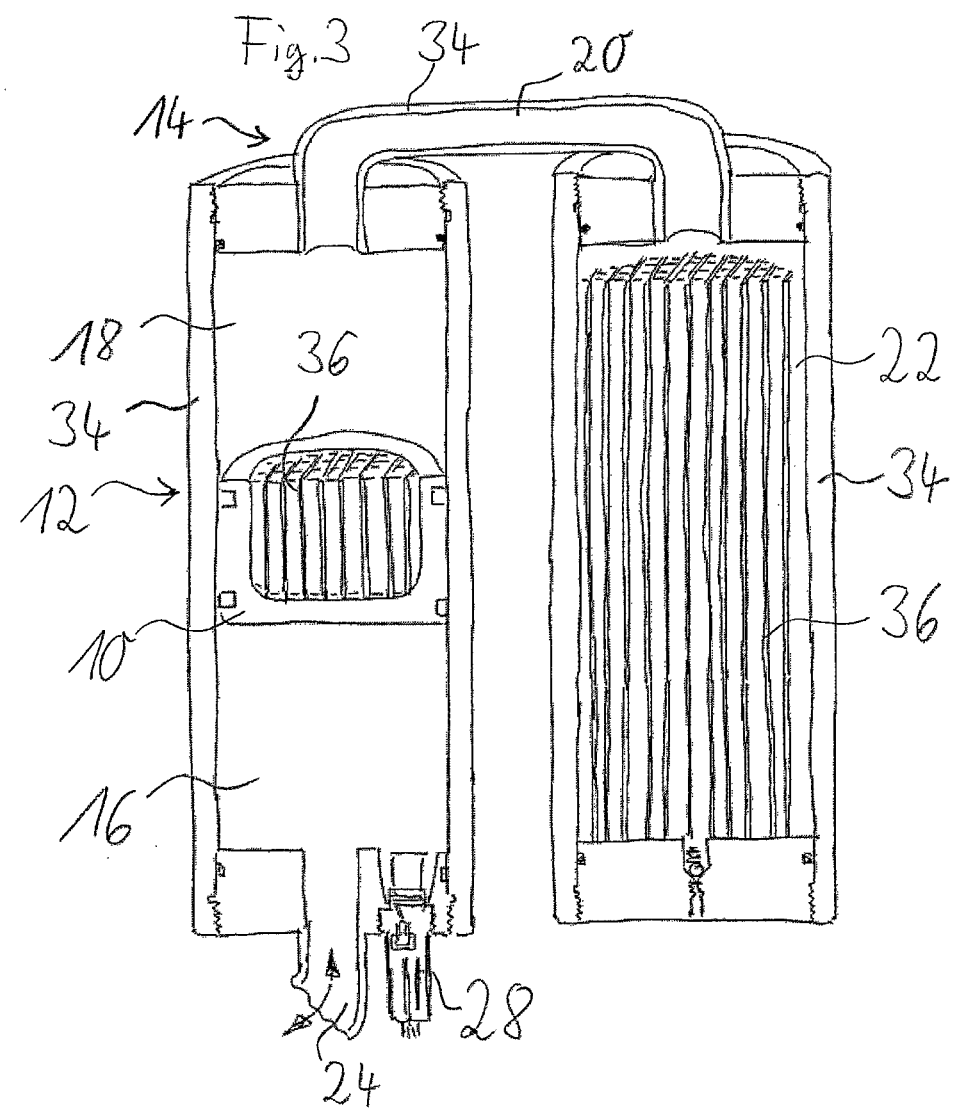

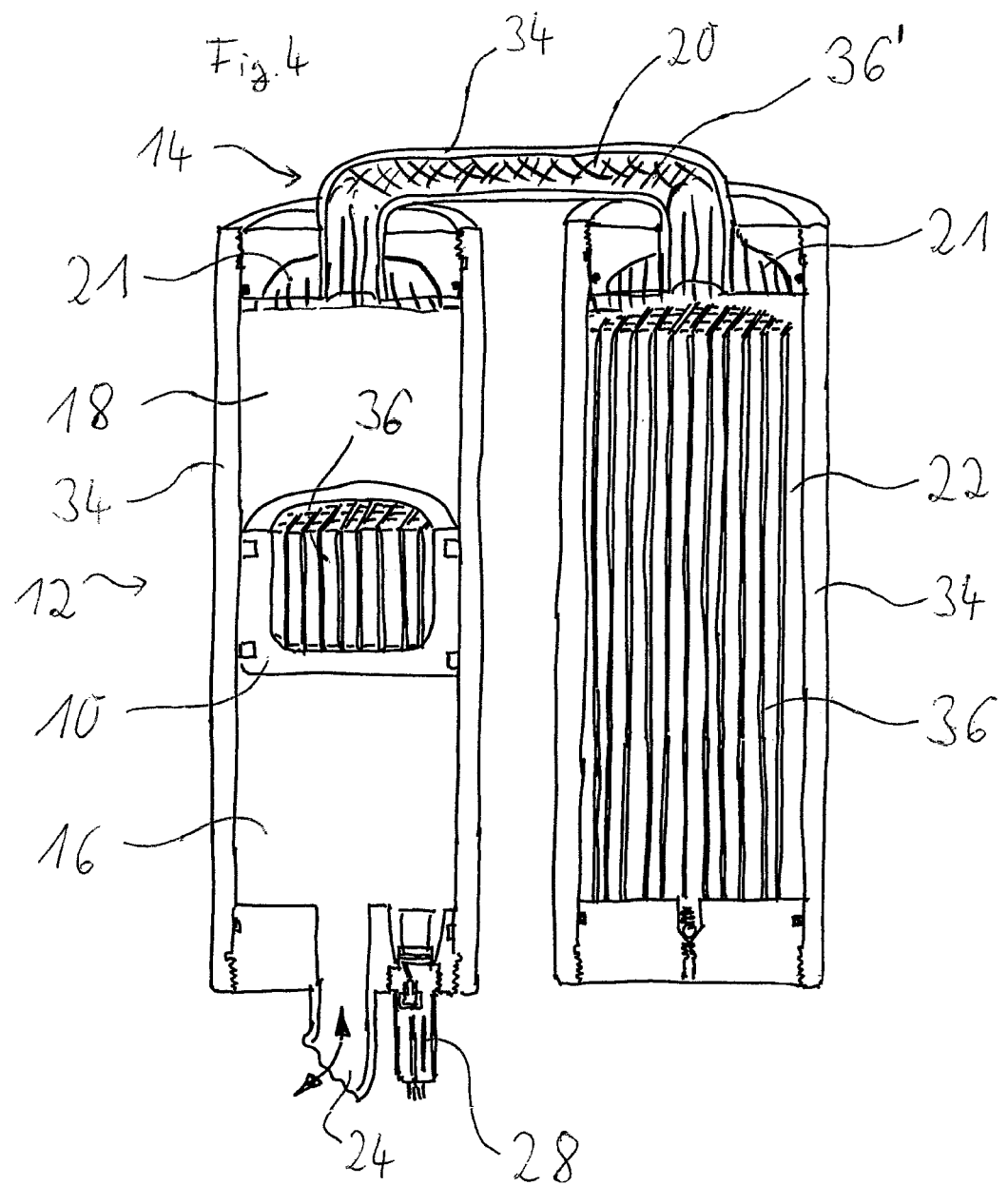

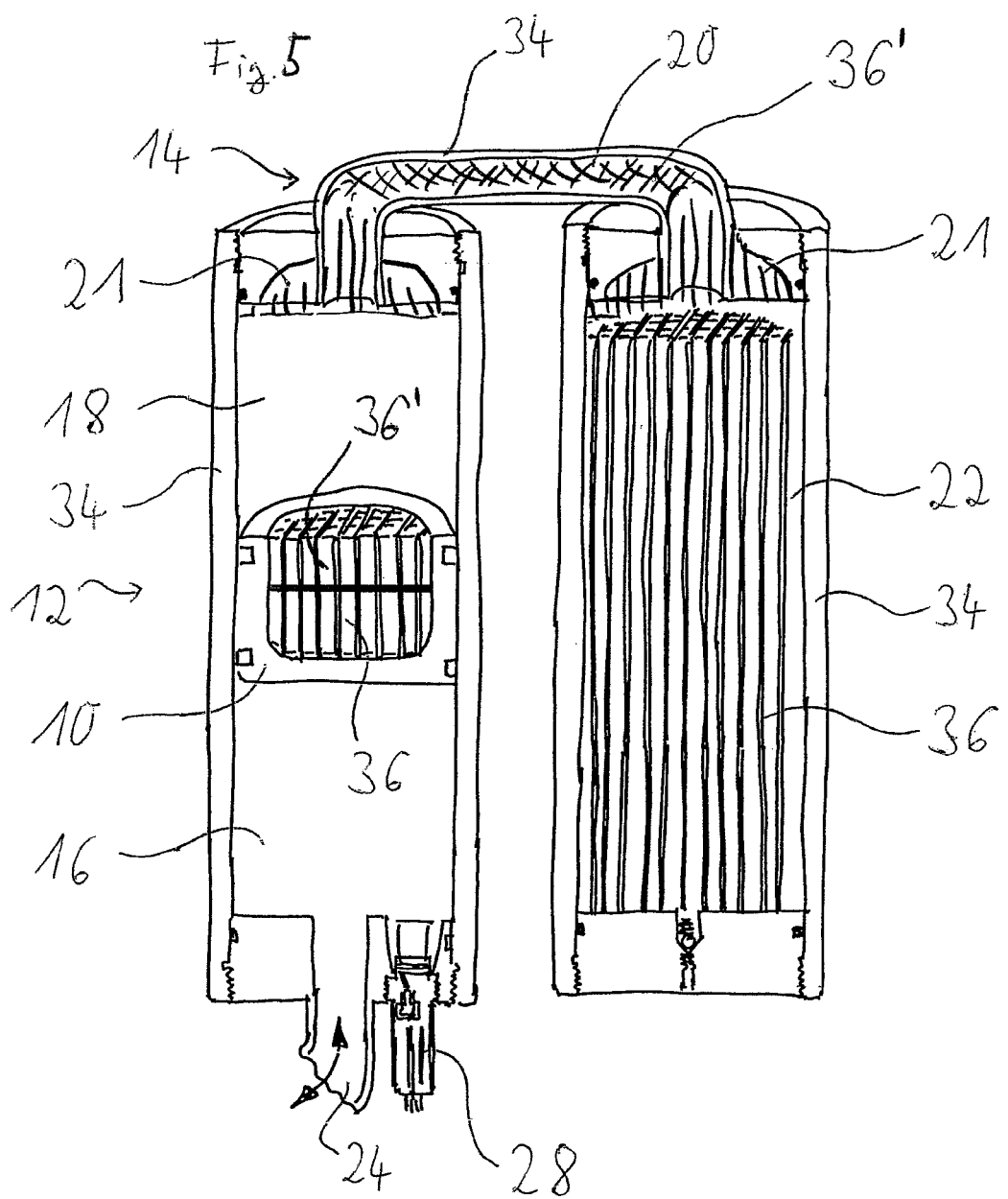

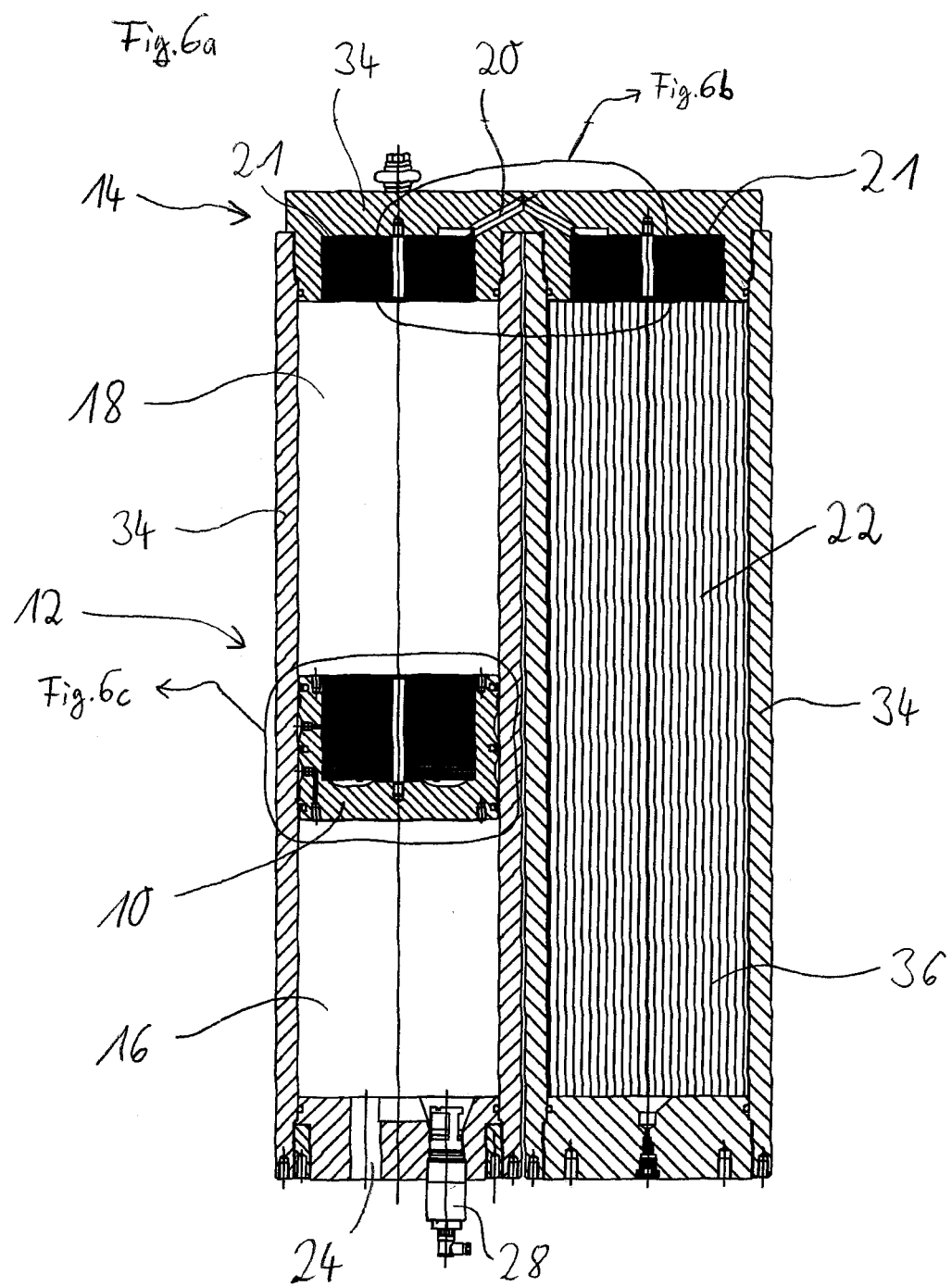

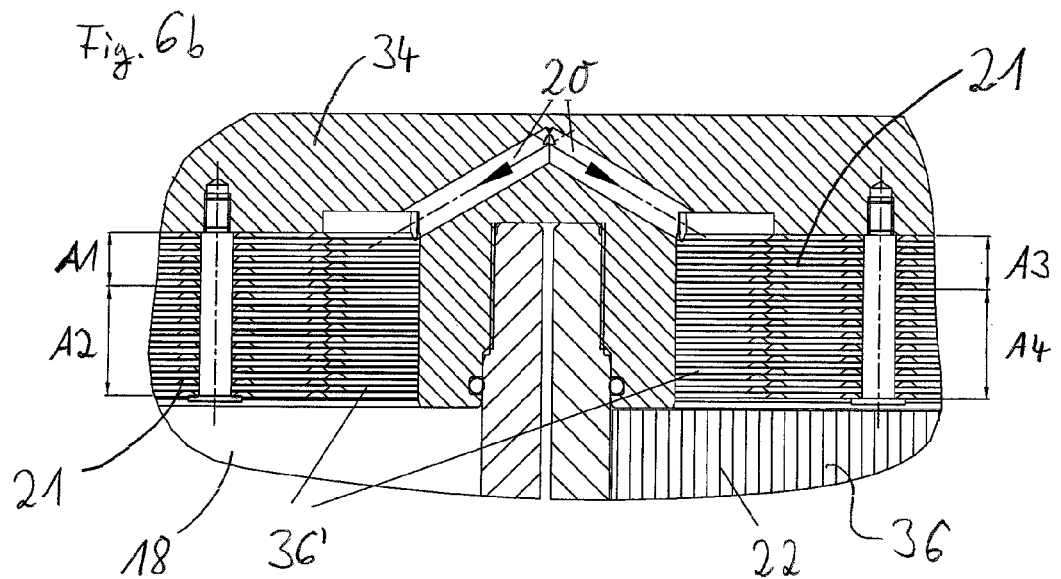
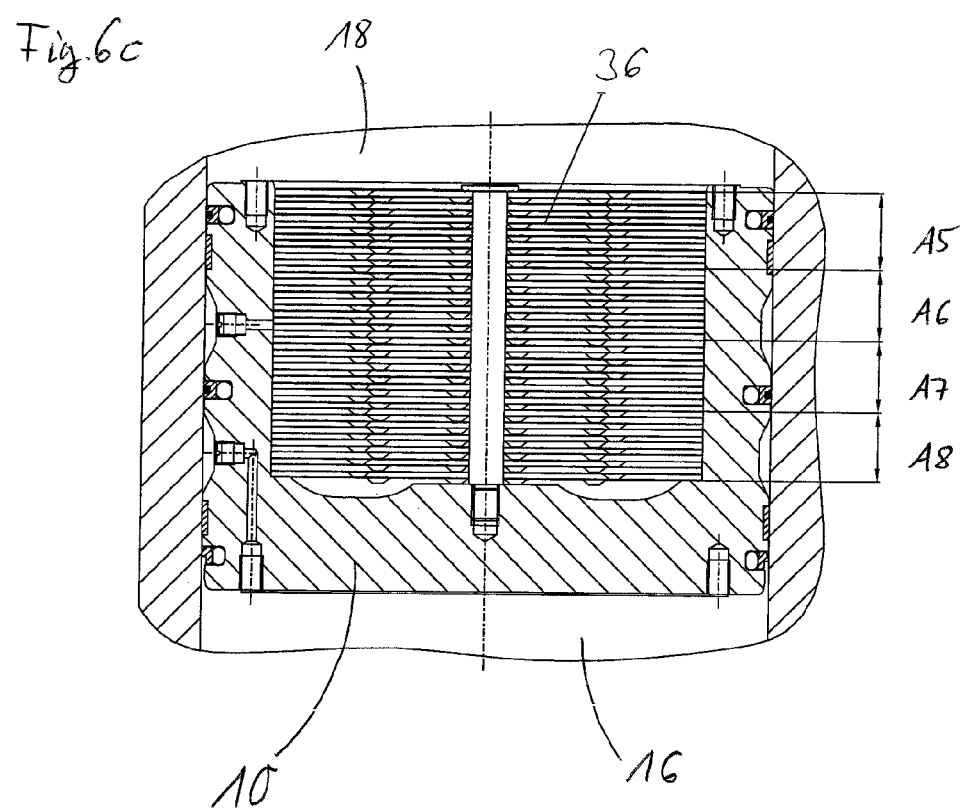

POSITION DETERMINATION APPARATUS

CROSS-REFERENCE TO RELATED APPLICATIONS

This patent application claims the benefit of priority to German Patent Application Serial No. 102012205363.8, filed Apr. 2, 2012, which is incorporated herein by reference in its entirety.

FIELD OF THE INVENTION

The invention relates to an apparatus and to a method for the determination of the position of a movable separation element, in particular of a piston which is arranged within an, in particular cylindrical, accumulator as a separator between a gas space and a fluid space.

BACKGROUND

Such accumulators, in particular piston accumulators, membrane accumulators or bubble accumulators are used in hydraulic systems, for example of excavators and, amongst other things, serve for the storage of hydraulic energy. In this connection, an accumulator can be configured as a cylindrical tube which is provided with a cover both on the fluid side and also on the gas side. The separation element separates the fluid, in particular a hydraulic liquid, such as e.g. oil, from gas, e.g. nitrogen.

If a fluid is now pressed against the gas in the accumulator, the separation element is displaced, whereby the gas is compressed. The gas therefore takes up energy. The filling of the accumulator typically takes approximately 3 to 5 seconds. At a later point in time the so stored energy can be regained by volume extraction.

In this connection the regained energy depends on the efficiency and on the arising losses. The latter can be attributed to the fact that the change of state does not take place adiabatically over the overall period of time, as it is not possible to configure the walls of the accumulator sufficiently insulated due to the high arising pressures. Moreover, gas losses can arise.

During operation the pressure in the gas space is matched to the pressure in the fluid space, so that the separation element is present at a suitable position within the accumulator. Possible differences between the pressure in the fluid space and the pressure in the gas space are attributed to the friction of the separation element.

In the following any volume which is filled with gas is understood as a gas space. The gas space thus includes both the region of the accumulator which is filled with gas and also one or more gas containers which are connected to the accumulator, as well as possible connection lines filled with gas including gas connections, which connection lines are also referred to as gas lines in the following X. The storage volume can be increased simply and cost-effectively by additionally connected gas containers.

In order to ensure a safe operation it is necessary to control the pressure in the gas space from time to time. Thus, for example, one has to expect certain losses of a gas in dependence on the kind of operation of the accumulator. Moreover, the pressure in the gas space is not allowed to undercut a certain minimum value so that the function of the system can be maintained.

It must also be constantly controlled, whether the accumulator can deliver the desired minimum energy. If a plurality of accumulators are switched in parallel it must be checked that no accumulator undercuts a certain minimum pressure. Moreover, faulty accumulators must be identifiable.

It is known to measure the temperature of the gas for the determination of the pressure in the gas space. A precise measurement of the temperature is, however, difficult in particular due to the inhomogeneous distribution of the gas. A determination of the position of the separation element based thereon with the aid of the gas laws is therefore not possible or flawed with large errors.

It is further known to determine the position of the separation element with the aid of sensors. In this way, for example, cable operated measurement systems are used. However, these are limited with respect to the maximum speed of the separation element and are unsuitable for high changes in load and large numbers of load changes.

Alternatively, the position of the separation element can be measured by means of a rod connected to the separation element which rod is guided out of the accumulator. A guided out rod, however, requires additional seals at the rod. Moreover, the additional demand in space is disadvantageous.

Magnetic apparatuses are also known which are attached at the separation element and which transfer information through the accumulator housing to the outside. Such systems are of complex design and for this reason are frequently prone to trouble.

It is further known to use ultrasonic sensors for the determination of the position of the separation element. However, if the formation of gas bubbles is brought about, for example, due to a fast expansion of the fluid, or an inhomogeneous distribution is brought about, for example due to a strong temperature gradient, the propagation of sound is disturbed by scattering and deflection of the sonic signals, whereby the ultrasonic data is distorted.

SUMMARY OF THE INVENTION

It is a feature of the invention to enable a precise determination of the position of the separation element with a compact manner of construction.

The above-referenced feature is provided by an apparatus for the determination of the position of a movable separation element which is arranged within an accumulator as a separator between a gas space and a fluid space. The determination apparatus includes at least one pressure sensor for the detection of pressure data. Also included is at least one ultrasonic sensor for the detection of ultrasonic data. Further included is at least one temperature sensor for the detection of temperature data. Yet further included is at least one calculation unit for the evaluation of the data and configured to determine the position of the separation element.

The temperature sensor provides a further sensor made available to the determination apparatus. The additional temperature data which can be transferred to the calculation unit, enables the determination of possibly arising gas losses.

In order to determine the gas amount and to recognize gas losses, one requires the pressure, the volume, as well as the temperature. The volume can be determined by the stroke of the separation element. The pressure in the gas space corresponds, in particular, except for differences due to friction, to the pressure in the fluid space. Also, the temperature in the gas space corresponds on average, in particular to the temperature in the fluid space.

When less gas is present in the accumulator the same pressure can result due to a higher temperature. A determination of the amount of gas is only insufficiently possible through an exclusive measurement of the pressure and the stroke. For example, if only a small amount of gas is present in the accumulator, then the pressure will reduce faster on a discharge than for a larger amount gas. In the first case the stored energy is in particular smaller than in the second case.

The amount of gas can be precisely determined by a temperature measurement. It can therefore also be exactly calculated whether the stored amount of energy is sufficient to carry out a certain function.

For example, if little energy is available in the accumulator a motor must correspondingly deliver more energy. This can lead to slower movement processes.

A state can be completely detected by the measurement of the pressure, of the piston position and also of the temperature.

Due to the fact that a plurality of independent sensors determine data, which can be provided at a calculation unit a precise determination of the position of the separation element is possible. The systems mutually complement themselves. Thus, for example, the determination of the position of the separation element with the aid of pressure data can be stabilized by the ultrasonic data. Alternatively, also the determination of the position of the separation element with the aid of ultrasonic data can also be improved by the pressure data. In this manner a precise determination of the position of the separation element is possible albeit arising inhomogeneities in the gas, gas losses or gas bubble formation in the fluid.

In this connection, in particular the gas losses can be determined by the temperature sensor.

A combined measurement of pressure, piston position and temperature also enables a precise determination of the amount of gas in the accumulator.

In accordance with an embodiment, at least one temperature sensor is coupled to the fluid in a heat conducting manner. In this connection the temperature sensor itself can be arranged in the fluid. Alternatively or additionally, at least one temperature sensor is coupled to the gas in a heat conducting manner. The temperature sensor can also, for example, be arranged in the gas space, this means in a region of the accumulator filled with gas, in a gas container or in a gas line. Alternatively or additionally at least one temperature sensor is coupled to the environmental air in a heat conducting manner. The temperature sensor is therefore, in particular present outside of the accumulator and measures the environmental temperature outside of the apparatus. In particular for a combination of these temperature sensors arranged at different positions a plurality of data is detected which together with the pressure data and the ultrasonic data enables a precise determination of the position of the separation element.

In accordance with a further embodiment, the pressure sensor detects the pressure in the fluid space. The pressure sensor is thus directly or indirectly connected to the fluid space, for example, via a tube. Alternatively or additionally it is, however, also plausible to detect the pressure in the gas space with the aid of a pressure sensor.

The ultrasonic sensor can, for example, radiate ultrasonic signals into the fluid space. For this purpose this is either directly or indirectly connected to the fluid space. Alternatively or additionally it is, however, also plausible that an ultrasonic sensor radiates into the gas space.

In accordance with a further embodiment, the calculation unit, the pressure sensor and the ultrasonic sensor form a common unit. The unit can moreover comprise the temperature sensor. The components can therefore be arranged in a housing or alternatively be integrated into a component group. However, it is also plausible to configure the calculation unit, the pressure sensor, the ultrasonic sensor and possibly the temperature sensor as separate components. In this way the data is transferred to the calculation unit via data lines. Alternatively also a wireless data transfer, e.g. via radio is plausible.

In accordance with a further embodiment a heat storing structure, in particular a solid body, is arranged in the gas space, for heat storage. The heat storing structure can, for example, be a metal or a metal alloy, e.g. steel and/or iron. In particular the heat storing structure can comprise metal wool, a knot of wire, sheet metal and/or lamella. The heat storing structure may be formed as a cylinder of corrugated sheet metal. Alternatively, sheet metal can be corrugated, whereby adjacent corrugated sheet metal may be aligned displaced with respect to one another in order to form hollow spaces. Also sheet metal discs of different thickness having pressed knobs can be possible as spacers, in particular in regions in which a high heat capacity per unit volume should be achieved and/or an individual matching to a place of installation is required. The heat storing structure makes available an additional thermal capacity to the gas space. On application of pressure by the fluid the gas is compressed at a nearly adiabatic change of state of the gas and the temperature of the gas is therefore increased. Without heat storage, the gas thus initially has a high pressure, however, cools down within the accumulator in a short period of time, approximately one second, and thus loses energy. In contrast to this the gas is almost instantaneously cooled by the heat storing structure for heat storage, so that the pressure in the gas space is already reduced during the compression.

A comparison of the heat capacity of nitrogen at, for example, 1,000 C and pressures of 100 200 bar to the heat capacity of steel results, in particular therein that an additional volume portion of 0.5% steel is sufficient in order to halve the increase in temperature in the gas space. For this reason, the accumulator can take up more energy, whereby the storage capacity is increased. The same is correspondingly true in a reverse manner on the expansion of the gas.

The gas pressure thus rapidly sets an isothermic change of state of the gas due to the heat storing structure, the change nearly adiabatic. This kind of change of state is thus known, whereby the determination of the position of the separation element is made more precise by the pressure measurement.

In accordance with a further embodiment a heat storing structure, in particular a solid body, is arranged for the heat storage in the separation element and/or in a gas line between a gas accumulator and a gas container and/or in a gas container.

The term gas line comprises in particular also a gas connector, i.e. a connection point between the actual gas line and the gas accumulator and/or gas container.

The heat storing structure can, for example, be a metal or a metal alloy, e.g. steel and/or iron. In particular the heat storing structure can comprise metal wool, a knot of wire, sheet metal, and/or lamella. The heat storing structure may be formed as a corrugated sheet metal cylinder. Alternatively, sheet metal can be corrugated, wherein adjacent sheet metal may be aligned and displaced with respect to one another in order to form hollow spaces. Also sheet metal discs of different thickness are possible having pressed knobs as spacers, in particular in regions in which a high heat capacity per unit volume should be achieved and/or an individual matching to the place of installation is required.

Thus the overall gas space which is not effected by the stroke of the separation element may be designed having a heat storing structure.

Also, the separation element itself can store heat. The heat accumulator is moved on a movement of the separation element without changing its structure. The heat accumulator is thus neither compressed nor expanded. The construction is thereby found to be simple and stable.

Heat can already be taken up by the gas through a heat accumulator in the gas line already on an overflow of the gas from the gas space into the gas container.

The heat accumulator in the separation element and/or in the gas line increases the storage capacity. Furthermore, the cooling of the gas is accelerated.

In accordance with a further embodiment, the volume portion of the heat storing structure, in particular the volume portion of metal in the separation element, in the gas line and/or in the gas container is different.

As a metal, for example iron can be used, since iron has a very large heat capacity per unit volume.

In accordance with an advantageous embodiment the specific heat capacity of the heat storing structure in the separation element and/or in the gas line and/or in the gas container is different. The specific heat capacity of the heat storing structure in the separation element is larger than in the gas line and/or in the gas line is larger than in the gas container.

In accordance with a further advantageous embodiment the volume portion of the heat storing structure in the gas line amounts to between approximately 20% and 70%, more particularly between approximately 25% and 50%, between approximately 30% and 40%, and/or in the gas container amounts to between approximately 5% and 15%, more particularly to approximately 10%. High temperatures arise precisely on compressing which have to be dispensed with as fast as possible. In order to operate the system, in particular in an isotherm manner, a large heat capacity is especially required in the gas line. The gas line can, in particular have different regions having different volume portions of the heat storing structure.

The invention furthermore relates to an apparatus having an accumulator and a movable separation element which is arranged within the accumulator as a separator between a gas space and a fluid space. A heat storing structure, in particular a solid body is arranged in the separation element for heat storage.

The heat storing structure can, for example, be a metal or a metal alloy, e.g. steel and/or iron. In particular, the heat storing structure can comprise metal wool, a knot of wire, sheet metal and/or lamella.

The heat storing structure may be formed as a corrugated sheet metal cylinder. alternatively sheet metals can be corrugated, wherein adjacent corrugated sheet metal may be aligned displaced with respect to one another in order to form hollow spaces. Also sheet metal discs of different thickness having pressed knobs as spacers are possible. The heat storing structure makes available an additional thermal capacity to the gas space.

The gas space can comprise a gas accumulator, one or more gas containers and/or gas lines. A heat storing structure for heat storage can also be provided in the gas container and/or in the gas line. The volume portion of the heat storing structure for heat storage in the separation element, in the gas line and/or in the gas container can be different. The volume portion of the heat storing structure for heat storage in the gas line can, for example, amount to between approximately 20% and 70%, in particular to between approximately 25% and 50%, and more particularly to between approximately 30% and 40%. The volume portion in the gas container can, for example, be between approximately 5% and 15%, in particular approximately 10%.

In accordance with an embodiment the volume portion of the heat storing structure for heat storage in the separation element amounts to between approximately 5% and 15%, in particular to approximately 10%.

Alternatively the separation element has at least two regions with different volume portions of the heat storing structure for heat storage. In particular, the volume portion in a first region lies between approximately 5% and 15%, particularly at approximately 10% and in a second region lies between approximately 20% and 70%, in particular between approximately 25% and 50%, more particularly between approximately 30% and 40%.

Also other regions are plausible having volume portions of approximately 10%, 20%, 30%, and 40%.

In particular a gliding transition between the regions can be provided.

In accordance with a further embodiment the heat storing structure for heat storage has a higher heat conductivity than a wall of the gas space. On compressing the gas, in particular a part of the stored energy is immediately stored in the form of heat energy in the heat storing structure for heat storage. The gas is heated less strongly and thereby dispenses energy slower to the environment via the walls of the gas space. Energy losses are thus reduced and the efficiency of the accumulator is therefore increased. Moreover, the pressure increase on compression extends less steep and the pressure is less time-dependent, since the temperature reduction by cooling is less. An as constant as possible pressure is desirable for a precise measurement.

In accordance with a further embodiment the heat storing structure for heat storage has a larger surface than an inner surface of the wall of the gas space. For the improved heat take up and/or discharge the heat storing structure for heat storage thus has a larger surface. This is already achieved thereby that the sheet metal or lamella has a grid-like structure or a corrugated structure. It is moreover plausible to use, for example steel wool or iron wool as heat storing structure for heat take up. Through the introduction of the heat storing structure for heat storage having a larger surface in the gas space the change of state approximates to the isothermal change of state. The heat storing structure for heat storage improves the prediction of the state through the pressure measurement in this manner, reduces energy losses and further increases the storage capacity.

The invention further relates to a method for the determination of a position of a separation element, in particular of a piston which moves within an, in particular cylindrical, accumulator between a gas space and a fluid space and separates these spaces from one another. Pressure data is detected, in particular in the fluid space with the aid of at least one pressure sensor in accordance with the invention. The pressure data is transferred to at least one calculation unit which evaluates the pressure data and determines the volume and the position of the separation element therefrom. At the same time or subsequent thereto, ultrasonic data is determined, in particular in the fluid space, with the aid of at least one ultrasonic sensor. Alternatively or additionally it is also plausible to detect pressure data and/or ultrasonic data in the gas space. The ultrasonic data is transferred to the calculation unit which corrects the position determination of the separation element with the aid of the ultrasonic data. The detected pressure data is thus stabilized, in particular by the ultrasonic data.

Through the combination of a pressure data detection and ultrasonic data detection the disadvantages of the individual detection methods can be overcome. A stable determination of the position of the separation element is thus made possible. Unknown sizes and data which influences the measurement can be parameterized with this method and a pressure path behavior can be determined from the measurements carried out. This behavior can, for example, be transferred to plants of the same kind and be used as a starting value for a plant specific automatic optimization.

The method further comprises a detection of temperature data, in particular of the fluid and/or of the gas and/or of the environmental air with the aid of at least one temperature sensor, wherein the temperature data can be transferred to the calculation unit and can in particular be used for the position determination. Thereby, e.g. the calculation of the position of the separation element can be improved on the basis of the equation of state of the non-ideal gas. The temperature of the fluid, of the gas and/or of the environment is measured, in particular to detect and determine gas losses.

In accordance with an embodiment erroneous and/or missing ultrasonic data is filtered and not used for the correction of the position determination. Erroneous ultrasonic measurement values can, for example, arise due to an erratic change of the measurement value or due to values which lie outside of the path of the separation element. The filtering, for example, takes place with the aid of suitable algorithms in the calculation unit. The calculation of the path of the separation element on the basis of the pressure measurement is thus corrected with the aid of corrected ultrasonic data.

In accordance with an embodiment, the volume is determined from the pressure data with the aid of the adiabatic equation of state for real gases. If the fluid is pressed into the accumulator, then the movement of the separation element leads to a pressure change in the gas space. The temperature in the gas increases for a compression initially adiabatically in order to then be matched to the temperature of the environment via a temperature exchange through the wall of the accumulator. For a sufficiently short period of time, for example, of up to two seconds, the change of state of the gas can be considered and calculated adiabatically. The volume and therefore the position of the separation element can be determined from the measured pressure on the basis of an equation of state of the non-ideal gas.

A central element for the determination of the position of the separation element is thus initially the calculation of the change of volume of the compressed or expanded gas on the basis of an equation of state for real gases. The Benedict-Webb-Rubin equation of state for real gases is, for example, suitable for the description of dense gases and represents a good compromise between simplicity and exactness. The pressure can be ex-pressed as a function of the temperature, of the volume and of the material specific constants in equations of states for real gases. Therefore, on consideration of gas-specific and simultaneously pressure-dependent and temperature-dependent parameters, one make determinations on the volume and therefore subsequently on the piston position from the measured pressure. For small changes, the following is hereby true: $P*VK[p,T]$=constant.

K is the so-called isentropic exponent, which describes the inner degrees of freedom of multi-atom gas particles. This is material-specific and depends on the temperature and the presence of the gas.

A deviation from the adiabatic change of state is adaptively considered for a subsequent determination of position. Due to the radiation of heat to the environment and a limited precise knowledge and stability of the relevant boundary conditions, such as for example, the operating temperature, the thermal coupling to the environment or the pressure losses, the calculation is not possible over a longer period of time with the aid of the equation for adiabatic changes of state. The filling of the accumulator typically takes approximately 3 to 5 seconds. In this period of time the wall of the accumulator already takes up a large amount of energy. This behavior is typical for a certain plant, can be reproduced and therefore can also be described and calculated. Through an adaptive method in which the deviations from the adiabatic behavior are determined the deviations are considered for the next calculation. This, for example, takes place with the aid of the calculation unit and corresponding numeric methods.

In accordance with a further embodiment the volume is determined from the pressure data with the aid of an isothermic equation of state for real gases. If the change of state of the gas corresponds to the isothermic change of state due to the heat exchange with the environment, e.g. after approximately three seconds, then the calculation unit will rely, for example on the isothermic equation of state for real gases, for the determination of the position of the separation element. The volume can thus initially be determined in accordance with the adiabatic change of state and after a certain time in accordance with the isothermic change of state.

If, for example, a heat storing structure for heat storage is introduced into the gas space the system is in an isothermic change of state already after a short period of time, as was previously mentioned. Therefore, the equation for an isothermic change of state can be used for the determination of the volume, in particular from the beginning.

The isentropic exponent K is defined as the ratio of the heat capacity at constant pressure to the heat capacities of constant volumes and corresponds to the temperature dependent gas expansion. The value depends on the number of degrees of freedom of the gas particles. The less the gas is thereby heated, which is achieved by the additional cooling by heat storing structure of the heat storing structure for heat storage, the better the behavior approximates to the isothermic boundary case. The calculation is therefore simpler and more exact.

In accordance with a further embodiment, the position determination of the separation element takes place continuously. Therefore a permanent control is possible. Alternatively it is also plausible to carry out the position determination merely once and/or at certain points in time.

The invention will be described in the following by way of example with reference to the drawings.

BRIEF DESCRIPTION OF THE DRAWINGS

FIG. 3 is a sectional view of an apparatus in accordance with the invention in accordance with a third embodiment;

FIG. 4 is a sectional view of an apparatus in accordance with the invention in accordance with a fourth embodiment;

FIG. 5 is a sectional view of an apparatus in accordance with the invention in accordance with a fifth embodiment;

FIG. 6*a* is a sectional view of an apparatus in accordance with the invention in accordance with a sixth embodiment;

FIGS. 6b and 6c illustrates detailed views of sections of the apparatus in accordance with FIG. 6a;

DETAILED DESCRIPTION

Figure 1:
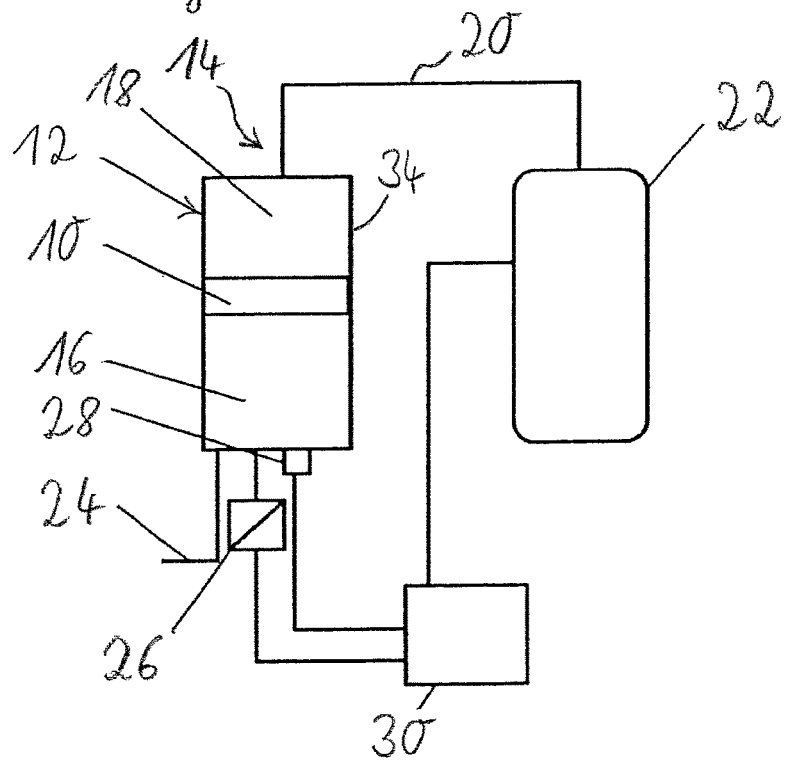
FIG. 1 is a schematic illustration of an apparatus in accordance with a first embodiment.

FIG. 1 shows an apparatus for the determination of the position of a movable piston 10 which forms a separation element 10. The piston 10 is arranged within a piston accumulator 12 and separates a gas space 14 from a fluid space 16. The gas space 14 comprises a gas accumulator 18 which is arranged in the accumulator 12, a gas line 20 as well as a gas container 22. The fluid space 16 is connected to a non-illustrated hydraulic system via a connection 24.

A pressure sensor 26 and an ultrasonic sensor 28 are both connected to the fluid space 16 and also to a calculation unit 30.

Figure 2:
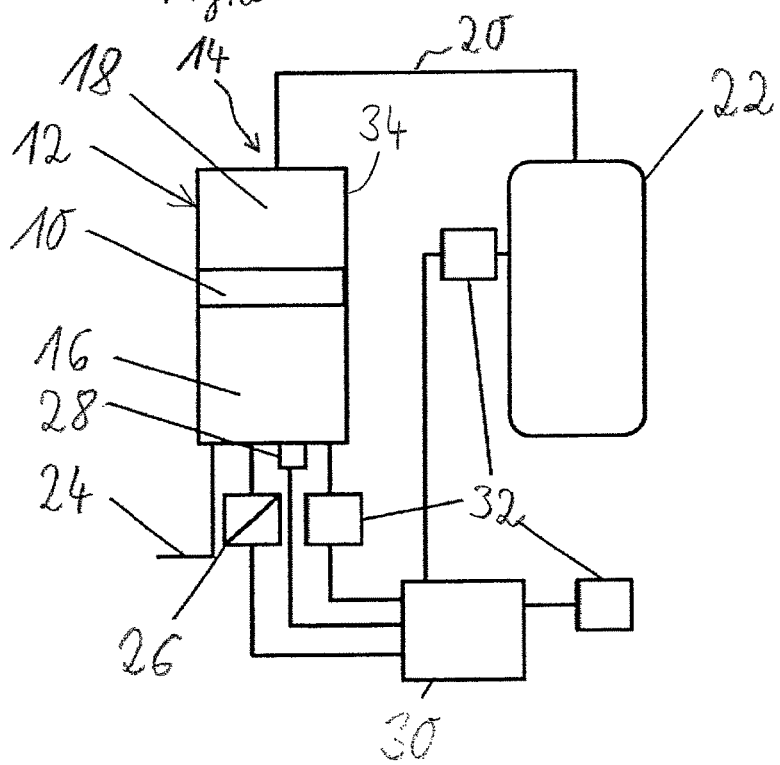
FIG. 2 is a schematic illustration of an apparatus in accordance with the invention in accordance with a second embodiment.

Three temperature sensors 32 are moreover illustrated in FIG. 2. In this way a temperature sensor 32 is connected to the fluid space 16 and a further temperature sensor 32 is connected to the gas container 22. An additional temperature sensor 32 is arranged outside of the apparatus. All three temperature sensors 32 are connected to the calculation unit 30.

If fluid, for example oil, flows into the fluid space 16 via the connection 24, then the piston 10 is displaced as a result of the arising pressure in the direction of the gas accumulator 18. The pressure in the gas space 14 is thereby increased. The temperature in the gas initially increases adiabatically to then be matched to the environmental temperature by a temperature exchange via a wall 34 of the gas space 14. For a short period of time the change of state of the gas can be considered adiabatically.

The pressure sensor 26 initially measures the pressure in the fluid space 16 and transfers its pressure data to the calculation unit 30. The calculation unit 30 determines the volume from the measured pressure on the basis of the adiabatic equation of state for real gases. Since the overall volume of the piston accumulator 12 is known also the position of the piston 10 can be determined therefrom. The change of state of the gas, however, only takes place adiabatically for a short period of time. After a certain period of time deviations are brought about. Since these deviations are typical and can be reproduced for a specific plant these can be described and calculated. With the aid of an adaptive method the calculation unit 30 can therefore determine deviations from the adiabatic behavior and consider these for the next calculation.

Furthermore, an ultrasonic sensor 28 determines ultrasonic data in that signals are radiated into a fluid space 16. The signals are reflected by the piston 10 and are received again by the ultrasonic sensor 28. Therefore the position of the piston 10 can be determined. If the propagation of sound is disturbed in the fluid, for example by gas bubbles, which can, e.g. arise for a fast expansion of the fluid, no sensible measurement is possible. Furthermore, inhomogeneities which, for example are caused by inflowing warmer liquid, can influence the measurement.

The determination of the position of the piston 10 takes place via a combination of the pressure data and the ultrasonic data. In this way e.g. initially the pressure in the fluid space 16 is measured with the aid of the pressure sensor 26. The data of the ultrasonic sensor 28 is used for correcting the determined position of the piston 10. In this connection initially missing or erroneous ultrasonic measurement values are filtered by the calculation unit 30 which erroneous ultrasonic measurement values, are caused, for example due to an erratic change of the measurement value or by values outside of the piston path. In this connection, the calculation unit 30 draws on suitable algorithms and/or numeric methods. Vice versa, it is also plausible to determine the position of the piston with the aid of ultrasonic data and to correct this by means of pressure data.

The temperature sensors 32 in accordance with FIG. 2 moreover determine temperature data of the fluid, of the gas and of the environmental temperature. This data likewise flows into the determination of the position of the piston 10. The calculation unit 30 is thus in a position to determine the position of the movable piston 10 precisely by means of the pressure data, the ultrasonic data and the temperature data.

In FIG. 3 a thermal capacity 36 is shown which is installed both in the gas accumulator 18, more precisely in the piston 10, and also in the gas container 22. The thermal capacity 36, also referred to herein as a heat storing structure, represents a means for heat storage 36. The thermal capacity 36 is comprised of a steel sheet metal of grid-like arrangement or corrugated sheet metal cylinders having a high heat conductivity and a large surface. The heat conductivity of the capacity 36 is, in particular higher than the heat conductivity of the wall 34 of the gas space, 14.

The volume portion of the thermal capacity 36 in the piston 10 and/or in the gas container 22 can amount to between approximately 5% and 15%, preferably to approximately 10%.

If the pressure in the gas increases the gas cools down immediately due to the thermal capacity 36 so that the pressure in the gas space 14 is already lower during the compression. The piston accumulator 12 can thereby take up more energy, whereby the storage capacity is increased. For this reason the gas pressure is set faster to the isotherm. The calculation unit 30 which draws on the pressure data of the pressure sensor 26, the ultrasonic data of the ultrasonic sensor 28 and possibly on the temperature data of the temperature sensor 32 therefore calculates the volume and thus also the position of the piston 10 on the basis of the equation for isothermic changes of state for real gases.

FIG. 4 essentially corresponds to the embodiments in accordance with FIG. 3. However, an additional thermal capacity 36' is provided in the gas line 20 and in the gas connections 21. The volume portion of this thermal capacity 36' can, in particular be larger than in the piston 10 or in the gas container 22 and amount to between approximately 20% and 70%, preferably to between approximately 30% and 40%.

FIG. 5 essentially corresponds to the embodiment in accordance with FIG. 4. However, the separation element 10 hereby is separated into two regions. In a first region the volume portion of the heat capacity 36 corresponds to e.g. approximately 10%, in particular to the volume portion in the gas container 22. This is preferably smaller than in a second region directly adjacent to the gas space 18. There the volume portion of the heat capacity 36' lies e.g. in a region between approximately 20% and 70%, preferably between approximately 30% and 40% and corresponds in particular approximately to the volume portion in the gas line 20.

FIG. 6a having the detailed views of FIGS. 6b and 6c correspond substantially to the embodiment in accordance with FIG. 4. As can, in particular be seen in FIG. 6b the gas connections 21 are configured as a type of cover for the gas accumulator 18 and the gas container 22. In the gas connections 21 a thermal capacity 36' is provided. The gas line 20 itself has no thermal capacity 36'. However, also there a thermal capacity can be provided.

The thermal capacity 36' of the gas connections 21 which can be formed by heat buffer sheet metal is divided into different regions A1, A2, A3 and A4. The volume of A2 corresponds to the volume of A4. These respectively take up a third of the overall volume of the gas connections 21. The volumes A1 and A3 are of equal size, however, only take up a third of the overall volume of the gas connections 21 as a whole.

The volume portion of iron in A1 and A3 amounts to respectively approximately 30%, in A2 to approximately 40% and in A4 to approximately 20%.

As can be seen in FIG. 6c the piston 10 is divided into the regions A5, A6, A7 and A8. The thermal capacity 36 which can be formed by the heat buffer sheet metal is different in the individual regions. The volume portion of iron amounts to approximately 40% in A5, to approximately 30% in A6, to approximately 20% in A7 and to approximately 10% in A8.

Both the gas connections 21 and also the piston 10 can be separated into more or less regions than illustrated possibly with different values for the volume portion of iron.

Figure 7:
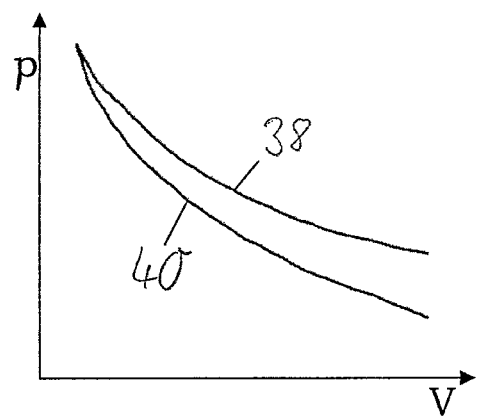
FIG. 7 is a diagram for illustrating an isothermic and adiabatic change of state.

FIG. 7 shows the dependency of the pressure p on the volume V for an isotherm change of stage 3S, as well as for an adiabatic change of state 40. Both curves and/or the equations on which the curves are based can be used for the determination of the volume and thus of the position of the piston 10.

Depending on the change of state the calculation unit 30 draws on the isotherm equation of state or the adiabatic equation of state for real gases. In this connection in accordance with FIG. 1 and FIG. 2, for example, the adiabatic equation state can be exclusively used. For a short period of time after the compression, in particular for up to one second, the behavior is thereby correctly described. Subsequently, the actual behavior deviates from the adiabatic change of state 40. This deviation can, for example, be counteracted by an adaptive method which will be explained in more detail in connection with FIG. 8.

Alternatively or additionally, the isotherm equation of state can be used after a certain point in time, for example after a second. In the embodiments in accordance with FIGS. 3, 4, 5 and 6a the gas is present quasi permanently in an isotherm state. For this reason the calculation unit 30 uses the isotherm equation of state for the calculation of the volume from the pressure.

Figure 8:
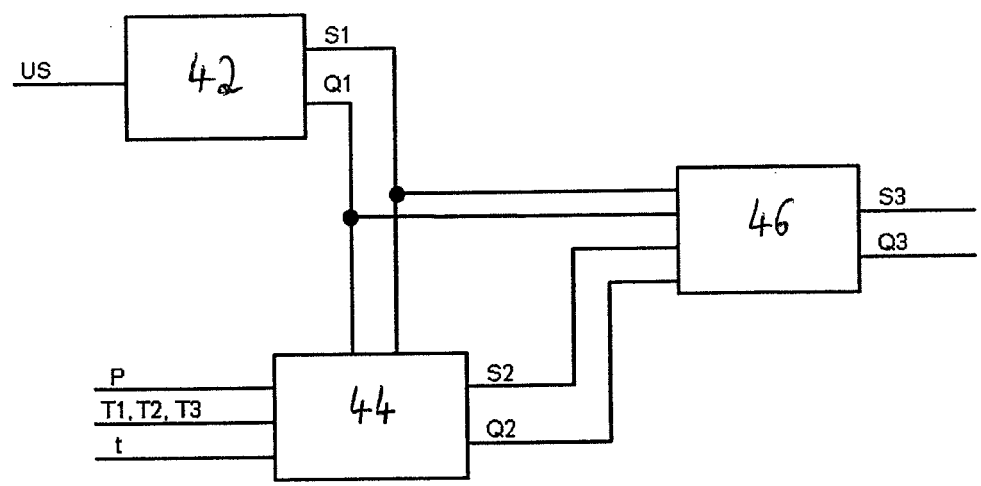
FIG. 8 is a schematic drawing for illustrating an adaptive evaluation.

FIG. 8 exemplifies an adaptive method for the determination of the position of the piston 10 on the basis of ultrasonic measurement values US, pressure measurement values p and temperature measurement values T1, T2, T3. In this way an ultrasonic evaluation unit 42, a calculation unit 44 and an output unit 46 are arranged in a calculation unit in accordance with FIG. 2.

A piston position S1 is determined and evaluated from the ultrasonic measurement values US via an evaluation function of the ultrasonic evaluation unit 42. Besides the piston position S1 calculated via the running time of the ultrasonic waves, a degree of confidence Q1 is also determined for this value. This degree of confidence Q1 is a measure for the probability that this value lies within a defined distribution about the real value. Criteria for the determination of the degree of confidence Q1 are the intensity of the reflected ultrasonic signal, the determined acceleration of the piston 10, missing ultrasonic signals or also multi-reflections. Abrupt jumps or unrealistically fast changes of the piston position S1, for example, result in a very low degree of confidence Q1.

The volume V of the gas is calculated from the measured pressure p and the measured temperatures T1, T2, T3 and from their extent over the time t. In this way the calculation takes place via a calculation function of the calculation unit 44 on the basis of the equation of state of the real gas. The piston position S2 can be deduced in turn from the volume V. A degree of confidence Q2 can also be determined for the so determined piston position S2 which degree of confidence depends on the precision of the individual sensors and in particular on the gradients of the change of the individual measurement values. $p*VIC(p,T)$ is constant for small changes. The larger the change the larger the possibility of a deviation is, whereby also the degree of confidence Q2 becomes correspondingly smaller. An association is present between the pressure p and volume V, this means erratic or unrealistically strong changes result in a low degree of confidence Q2.

The piston position S2 calculated via the equation of state is compared to the piston position S1 in the calculation function of the calculation unit 44 which piston position S1 was determined from the ultrasonic measurement by means of the ultrasonic evaluation unit 42. For a high degree of confidence of the ultrasonic measurement Q1 the piston position S2 calculated via the equation of state is corrected for a deviating result. This correction is used as an adaptive parameter in the calculation of the equation of state and is considered for the further calculations. The calculation function of the calculation unit 44 thus determines the volume and therefore the piston position Q2 from the measured pressure values p and temperatures T1, T2, T3, corrects this calculation for ultrasonic results having a high degree of confidence Q1 and interpolates these calculated values into the regions in which the ultrasonic measurement has a low degree of confidence Q1 with the aid of the calculated values.

Typical spacings in time which have to be bridged by interpolation lie in the order magnitude of approximately one second. For the so calculated piston position 83 in turn a degree of confidence Q3 is determined which substantially results from the degrees of confidence Q1 of the ultrasonic measurement and the calculation.

The piston position 83 is passed on by an output function of the output unit 46. In this way the piston position 83 calculated either from the equation of state and supported with the aid of ultrasonic results is directly output in dependence on the degree of confidence Q3 or for a sufficiently high degree of confidence Q1 also the ultrasonic result for the piston position 81 is directly output. The degree of confidence Q3 of the piston position 83 of the output function of the output unit 46 is composed of the degrees of confidence Q1, Q2 of the input values and can be used to generate an error message or a warning signal as soon as a defined degree of confidence is undercut and the determined piston position 83 is too inaccurate.

A cooling of the gas, for example by a means of heat storage 36 in accordance with FIG. 3 is advantageous for the accuracy and the degree of confidence Q3 of the calculated piston position S3.

The method in accordance with the invention thus enables an exact determination of the position of the movable separation element 10 for a compact manner of construction.

The invention claimed is:

1. A method for the determination of a position of a separation element which moves within and separates an accumulator between a gas space and a fluid space, the method comprising:
   detecting pressure data with at least one pressure sensor;
   detecting temperature data with at least one temperature sensor;
   transferring the pressure data and temperature data to at least one calculation unit configured to evaluate the pressure data and temperature data and determining a volume and the position of the separation element;
   detecting ultrasonic data with at least one ultrasonic sensor; and
   transferring the ultrasonic data to the calculation unit for correcting the position determination of the separation element with the ultrasonic data.

2. A method in accordance with claim 1, wherein the detecting of the pressure data is in the fluid space.

3. A method in accordance with claim 1, wherein the detecting of the temperature data is of at least one of a fluid, a gas and environmental air.

4. A method in accordance with claim 1, wherein the detecting of the ultrasonic data is in the fluid space.

5. A method in accordance with claim 1, wherein an erroneous missing ultrasonic data is filtered from the positional determination.

6. A method in accordance with claim 1, wherein the determining a volume is from the pressure data with an adiabatic equation of state for real gases.

7. A method in accordance with claim 1, wherein a deviation from the adiabatic change of state is considered adaptively for a subsequent position determination.

8. A method in accordance with claim 1, wherein the determining a volume is from the pressure data with an isotherm equation state for real gases.

9. A method in accordance with claim 1, including determining gas losses by the pressure sensor.

10. A method in accordance with claim 1, wherein the determining a volume is a volume of the gas space.

* * * * *